Feb. 12, 1946.  A. F. TURNER  2,394,951
SURFACE TESTING DEVICE
Filed June 19, 1943
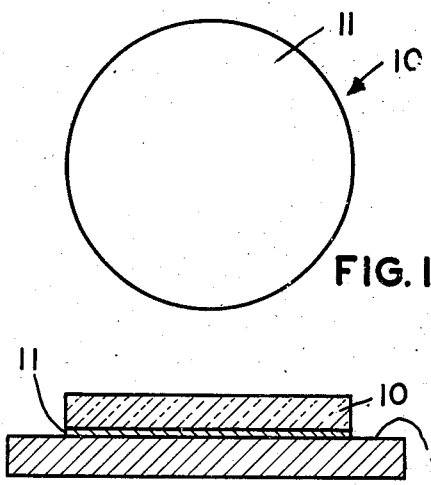
FIG. 1
FIG. 2
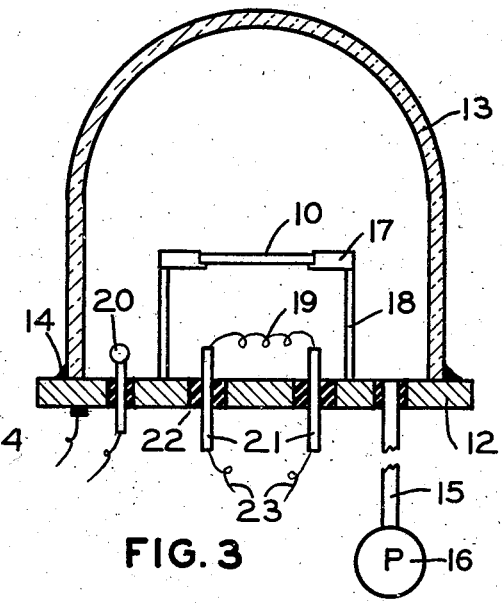
FIG. 3
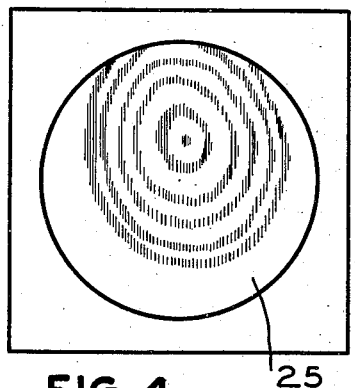
FIG. 4
PRIOR ART
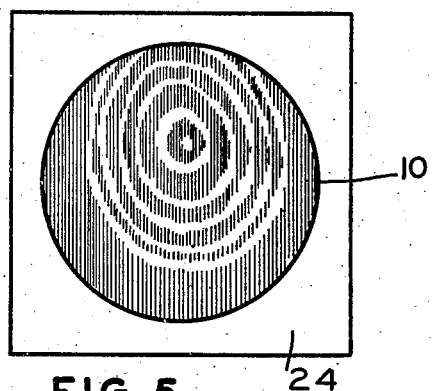
FIG. 5
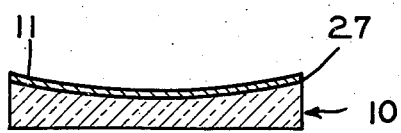
FIG. 6
ARTHUR F. TURNER
INVENTOR
BY
ATTORNEYS Patented Feb. 12, 1946

2,394,951

UNITED STATES PATENT OFFICE 2,394,951

SURFACE TESTING DEVICE

Arthur F. Turner, Brighton, N. Y., assignor to Bausch & Lomb Optical Company, Rochester, N. Y., a corporation of New York Application June 19, 1943, Serial No. 491,517

1 Claim. (Cl. 88—14)

This invention relates to testing devices and more particularly to an optical test glass for testing highly polished surfaces.

Optical test glasses heretofore proposed have generally comprised a transparent member having a reference surface which was brought into contact with the surface to be tested. The surface under test could be compared with the reference surface by observing the interference bands formed by the air film intermediate the surface being tested and the reference surface of the test glass.

Such test glasses have long been used in the optical arts for testing the surfaces of precision lenses, and related optical elements but their use has not been great in other arts. This has been largely due to the fact that when a polished metal surface is tested in the usual manner by means of a test glass, the interference bands lack contrast. As there is very little contrast between the bands, it is difficult for an operator to see or count the number of bands. The lack of contrast is due to the very unequal reflectance of the glass surface and the surface being tested, and the contrast becomes less the higher the reflectance of the surface undergoing test.

While it has been proposed to use a semi-transparent film on the reference surface of a test glass in order to increase the contrast between the bands, it is an object of the present invention to improve upon such test glasses by providing a more rugged and durable film which also further increases the contrast between the bands.

Other objects and advantages of the present invention will appear from the following description taken in connection with the accompanying drawing in which:

Fig. 1 is a top plan view of the test glass of the present invention.

Fig. 2 is a vertical section of the test glass shown on a workpiece.

Fig. 3 is a sectional view, partly in elevation, of one form of apparatus which can be used for forming the film carried by the reference surface of the test glass.

Fig. 4 illustrates a test glass of the prior art in use.

Fig. 5 is a view similar to Fig. 4 but showing the interference bands developed in use by the test glass of the present invention.

Fig. 6 is a vertical section of a modified form of the test glass of the present invention.

The device of the present invention, referring now to the drawing, comprises a transparent member 10 having an optically correct reference surface carrying a thin semi-transparent film 11.

The film 11 may be formed on the reference surface of the body 10 by any means desired, but in the present preferred form of the invention, the film is formed by a high vacuum thermal evaporation process. An apparatus which may be used for forming the film is shown in Fig. 3 and comprises a metallic base plate 12 supporting an evacuable container such as the bell jar 13. A vacuum tight seal is formed between the lower edge of the bell jar 13 and the base plate 12 by any suitable sealing composition 14. The interior of the bell jar 13 is connected by some conventional means such as the conduit 15 to a high vacuum pump, shown here diagrammatically at 16. The body 10 is mounted in a suitable support 17, held above the base plate 12 by stanchions 18, so that the reference surface faces a filament 19 supported between current conducting posts 21 passed through suitable insulating bushings 22, mounted in apertures in the base plate 12. The filament 19 is connected to a suitable source of current, not shown in the drawing, through the posts 21 and lead-in conductors 23.

The film-forming metal is preferably formed into a U shaped strip and suspended from the filament 19 after which the seal 14 is completed, and the bell jar 13 partially evacuated by means of the pump 16. The surface to be coated is then subjected to a glow discharge created by a high voltage discharge between the electrode 20, insulatedly mounted in the base plate 12, and the base plate itself. The bell jar is then further evacuated and the filament 19 is energized to heat the U shaped strip of the metal to the evaporation temperature thereof whereby a distilled film of the metal is formed on the underneath surface of the member 10.

The film is formed by evaporating the alloy, sold under the trade name "Inconel," which comprises substantially 80% nickel, 14% chromium, and 6% iron. A film of "Inconel" produced by a high vacuum thermal evaporation process is quite rugged, in that, it is resistant to frictional wear and is highly resistant to atmospheric corrosion. As the film is rugged and resistant to wear, the reference surface of the test glass can be placed in direct contact with the surface 24 to be tested, as shown in Figs. 2 and 5. Furthermore, it is substantially neutral in color when viewed by reflected light so that a test glass of the present invention can be effectively used in ordinary white light as well as monochromatic light.

The metal film 11 increases the reflective power of the reference surface of the test glass, so that it is more comparable with that of the surface or surfaces which are to be tested with the glass. Although the thickness of the film is not absolutely critical, it has been found that a film of a thickness sufficient to reduce transmission approximately 50% gives the best contrast when used with polished metal or other highly reflecting surfaces. A film of a thickness of approximately 0.004 micron will reduce transmission substantially 50%, although films having thicknesses as great as 0.02 micron will greatly enhance the contrast.

The alteration in contrast brought about by the semi-transparent film on the reference surface of the test glass is due to the increased number of multiply reflected rays in the air space between the reference surface of the glass and the surface tested. The increased number of multiply reflected rays greatly enhances the contrast between the interference bands. This is illustrated by Figs. 4 and 5 of the drawing, Fig. 4 illustrating the contrast to be expected where the reference surface of the test glass 25 is not filmed, while Fig. 5 illustrates the interference bands set up by the test glass 10 of the present invention.

The changes in the character of the interference fringes with the film of "Inconel" are unexpected, in that, the changes are different than those obtained with films of other metals such as aluminum. With the latter metal, the film produces narrow dark lines on a bright background when used in reflected monochromatic light, while an "Inconel" film produces narrow bright lines on a black or gray background when viewed by reflected monochromatic light. This difference in behavior can probably be explained by the relatively low reflecting power of the glass-Inconel interface, together with the higher absorbing power of Inconel as compared with aluminum or silver.

The narrow bright lines produced by the Inconel film on the test glass are such as can be readily seen by an operator. The contrast between the bright lines and the dark background is considerable and the test glass of the present invention is highly satisfactory for use with polished metallic or other highly reflecting surfaces.

The test glass of the present invention is not limited to one for testing flat surfaces and it is to be understood that the reference surface of the test glass 10 may be either cylindrical or spherical. There is shown in Fig. 6 a test glass having a cylindrical reference surface 27 which might, for example, be used for testing the surface of highly polished cylindrical bearing surfaces.

If the film 11 should become worn through continued use, the worn film can easily be removed by hydrochloric acid, and a new film laid down on the reference surface by the evaporation process described heretofore.

It is to be understood that while a preferred embodiment of the present invention has been described and illustrated herein, the invention is not to be limited thereby, but is susceptible of changes in form and detail within the scope of the appended claim.

I claim:

A device for indicating the deviation of a highly polished metal surface from a predetermined standard surface comprising a transparent member having an optically correct reference surface forming the standard surface against which is positioned the surface to be tested; and a semi-transparent film of an alloy comprising approximately 80% nickel, 14% chromium, and 6% iron, adhering to said reference surface, said film having a uniform thickness of .004–.02 microns and substantially reducing light transmission through said transparent member.

ARTHUR F. TURNER.